(12) United States Patent
Jeong et al.

(10) Patent No.: US 12,485,702 B2
(45) Date of Patent: Dec. 2, 2025

(54) DRIVE AXLE ASSEMBLY

(71) Applicant: HYUNDAI WIA CORPORATION, Gyeongsangnam-do (KR)

(72) Inventors: Chang Hee Jeong, Gyeonggi-do (KR); Hee Joon Kim, Incheon (KR); Bum Jae Lee, Gyeonggi-do (KR)

(73) Assignee: HYUNDAI WIA CORPORATION, Gyeongsangnam-do (KR)

( * ) Notice: Subject to any disclaimer, the term of this patent is extended or adjusted under 35 U.S.C. 154(b) by 583 days.

(21) Appl. No.: 17/895,439

(22) Filed: Aug. 25, 2022

(65) Prior Publication Data

US 2024/0066919 A1 Feb. 29, 2024

(51) Int. Cl.
*B60B 27/00* (2006.01)

(52) U.S. Cl.
CPC ...... *B60B 27/0073* (2013.01); *B60B 27/0005* (2013.01); *B60B 27/0015* (2013.01); *B60B 27/0068* (2013.01)

(58) Field of Classification Search
CPC ............ B60B 27/0073; B60B 27/0005; B60B 27/0015; B60B 27/0068
USPC ............................ 301/126; 384/544; 464/178
See application file for complete search history.

(56) References Cited

U.S. PATENT DOCUMENTS

| 3,030,825 | A * | 4/1962 | Diederich | B60K 17/165 |
| 7,001,302 | B2 * | 2/2006 | Wachter | F16H 48/08 |
| 10,352,367 | B2 * | 7/2019 | Miller | B60K 17/22 |
| 2024/0263674 | A1 * | 8/2024 | Jeong | B60T 8/329 |

FOREIGN PATENT DOCUMENTS

| DE | 102020205355 A1 | 11/2020 |
| DE | 102021113101 A1 | 12/2021 |
| DE | 102021202008 A1 | 2/2022 |
| EP | 2995471 A1 | 3/2016 |
| JP | 2007315423 A | 12/2007 |
| JP | 2013082293 A | 5/2013 |
| JP | 5868643 B2 | 2/2016 |
| KR | 1020100064081 | 6/2010 |

OTHER PUBLICATIONS

German Office Action dated Apr. 25, 2023.

* cited by examiner

*Primary Examiner* — Greg Binda
(74) *Attorney, Agent, or Firm* — Dickinson Wright PLLC

(57) ABSTRACT

A drive axle assembly capable of reducing drag torque by eliminating an inner bearing seal from a wheel bearing and capable of reducing the generation of frictional noise at corrugations of a boot. The drive axle assembly includes a wheel bearing assembled with a wheel housing, an outer ring having a ring shape and including an outer-diameter portion secured to an outer wheel of a wheel bearing, a boot including a large-diameter portion formed at one end thereof and assembled with an inner-diameter portion of the outer ring, and a bearing seal unit disposed between a small-diameter portion formed at the other end of the boot and a drive shaft to restrict rotation of the boot and to prevent introduction of foreign substances.

14 Claims, 11 Drawing Sheets

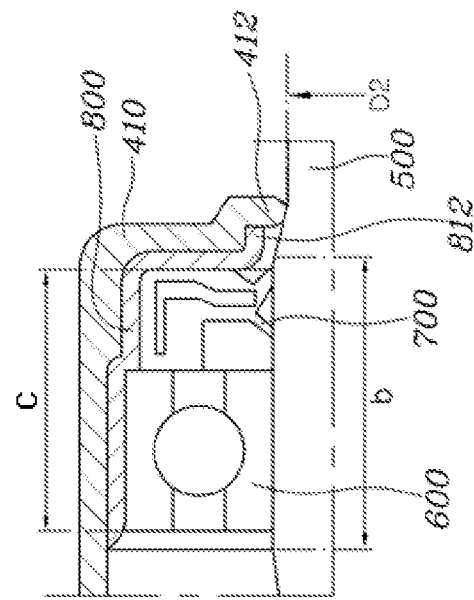
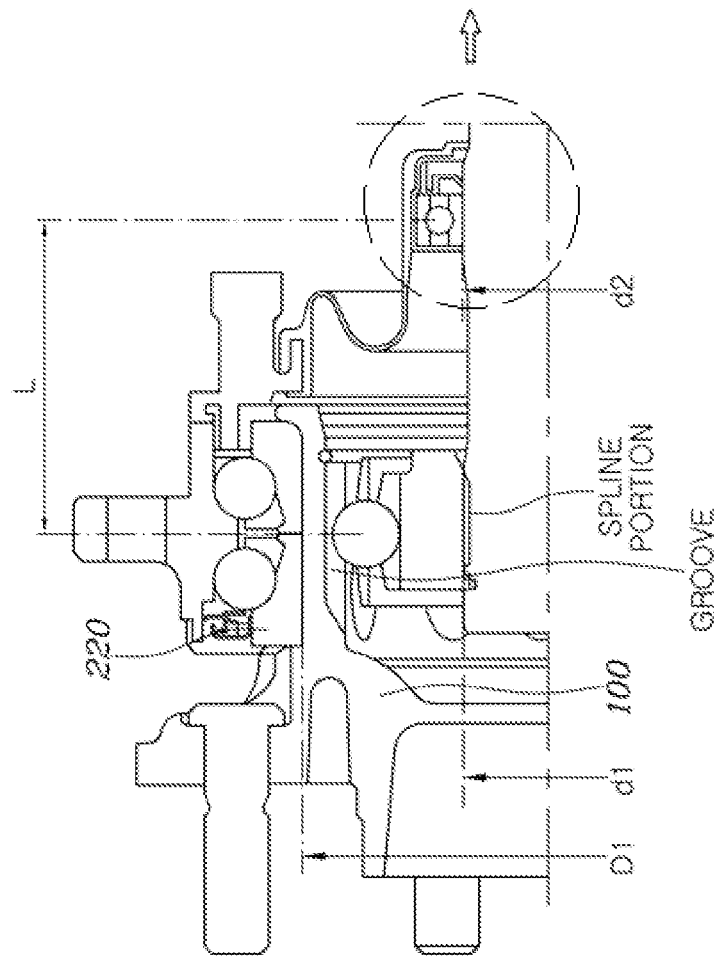
FIG. 11A
FIG. 11B

DRIVE AXLE ASSEMBLY

BACKGROUND

1. Field

The present disclosure relates to a drive axle assembly capable of reducing drag torque and thus improving the fuel efficiency of a vehicle by eliminating an inner bearing seal from a wheel bearing and capable of reducing the generation of frictional noise at corrugations of a boot.

2. Description of the Related Art

An integrated drive axle (IDA) is structured such that an outer race of a drive shaft is integrated with a hub of a wheel bearing.

Because the function of the wheel bearing and the function of the drive shaft are integrated, the weight of the product and the cost of manufacturing the same are reduced. In addition, the distance between a wheel center and a joint center is reduced, and thus the articulation angle of the drive shaft is increased. In addition, the pitch circle diameter (PCD) of the wheel bearing is increased, and thus the lateral rigidity of the vehicle is increased.

However, the increase in the size of the wheel bearing increases the drag torque of the wheel bearing, leading to degradation in the fuel efficiency of the vehicle.

As a countermeasure thereto, the structure of an inner bearing seal for ensuring the sealed state of the wheel bearing may be modified in order to reduce the drag torque of the wheel bearing.

However, because the inner bearing seal, which is tightly interposed between an outer wheel and an inner wheel of the wheel bearing, is exposed to the outside of a boot, the sealing capability of the inner bearing seal needs to be maintained at a predetermined level or higher in order to prevent foreign substances from entering the wheel bearing.

However, the drag torque increases in proportion to the increase in the sealing capability of the inner bearing seal. Therefore, there is a limitation on the extent to which the drag torque can be reduced.

That is, because the inner bearing seal is interposed between the inner wheel and the outer wheel, the circumferential length of the inner bearing seal is relatively long, and thus the drag torque increases due to the sealing effect of the inner bearing seal.

Furthermore, because the boot rotates together with the constant velocity joint, corrugations of the boot are repeatedly folded and unfolded in the circumferential direction when the vehicle makes a full turn. In this course, soil, a deicing agent, or the like is repeatedly attached to and separated from the portions between the corrugations of the boot due to contact with moisture, thus generating frictional noise.

The information disclosed in this Background of the Disclosure section is only for enhancement of understanding of the general background of the disclosure, and should not be taken as an acknowledgement or any form of suggestion that this information forms the related art already known to a person skilled in the art.

SUMMARY OF THE DISCLOSURE

Therefore, the present disclosure has been made in view of the above problems, and the present disclosure provides a drive axle assembly capable of reducing drag torque and thus improving the fuel efficiency of a vehicle by eliminating an inner bearing seal from a wheel bearing.

The present disclosure also provides a drive axle assembly capable of reducing the generation of frictional noise at corrugations of a boot.

In accordance with the present disclosure, the above and other objects can be accomplished by the provision of a drive axle assembly including a wheel bearing assembled with a wheel housing, an outer ring having a ring shape and including an outer-diameter portion secured to an outer wheel of a wheel bearing, a boot including a large-diameter portion formed at one end thereof and assembled with an inner-diameter portion of the outer ring, and a bearing seal unit disposed between a small-diameter portion formed at the other end of the boot and a drive shaft to restrict rotation of the boot and to prevent introduction of foreign substances.

The outer ring may directly face balls provided in the wheel bearing through a space between the outer wheel and an inner wheel of the wheel bearing.

The outer ring may be provided with an ABS sensor.

The bearing seal unit may include a shaft bearing, which is disposed between the small-diameter portion of the boot and the drive shaft so as to surround a portion of the drive shaft, and a shaft seal, which is disposed between the shaft bearing and the distal end of the small-diameter portion of the boot.

The drive axle assembly may further include a bearing housing press-fitted into the boot so as to be in contact with the inner circumferential surface of the small-diameter portion of the boot and to surround the shaft bearing and the shaft seal. The bearing housing may have a stepped portion formed on the inner surface thereof to form a boundary between the shaft bearing and the shaft seal.

The boot may have a housing support portion extending radially inwards from the distal end of the small-diameter portion thereof. The bearing housing may have a seal support portion extending radially inwards from an end of the bearing housing that faces the housing support portion. The seal support portion may be supported by the inner surface of the housing support portion.

The bearing housing may have a maze-forming portion extending in a stepped form toward the housing support portion along the inner circumferential surface of the seal support portion. The boot may have a foreign-substance-blocking portion extending radially inwards in a stepped form along the inner circumferential surface of the housing support portion so as to cover the maze-forming portion.

The drive axle assembly may further include a reinforcement ring coupled to the outer-diameter portion of the outer ring. The reinforcement ring may be inserted into the wheel bearing such that the outer circumferential surface thereof is in contact with the inner circumferential surface of the outer wheel of the wheel bearing.

The reinforcement ring and the outer wheel of the wheel bearing corresponding thereto may be coupled to each other in a groove-and-protrusion coupling manner.

The drive axle assembly may further include an O-ring interposed between the reinforcement ring and the outer wheel of the wheel bearing corresponding thereto.

The outer wheel may be partially inserted into the outer ring such that the outer circumferential surface thereof is in contact with the inner circumferential surface of the outer ring.

The outer wheel may have a stepped insertion portion extending from an end of the outer circumferential surface thereof in a stepped form so as to have a reduced outer diameter. The stepped insertion portion may be press-fitted into the outer ring such that the outer circumferential surface thereof is in contact with the inner circumferential surface of the outer ring.

The outer wheel may have a stepped insertion portion extending from an end of the outer circumferential surface thereof in a stepped form so as to have a reduced outer diameter, and the outer ring may have a stepped insertion groove formed in the outer-diameter portion thereof so as to correspond to the stepped insertion portion. The stepped insertion portion may be press-fitted into the stepped insertion groove.

The large-diameter portion of the boot may envelope the inner-diameter portion of the outer ring such that a gap having a size less than a predetermined value is formed between the large-diameter portion of the boot and the wheel housing. The outer ring may have a protruding portion formed on the inner surface thereof toward the wheel bearing such that a gap having a size less than a predetermined value is formed between the protruding portion and the inner surface of the wheel bearing.

The ratio of the length of the bearing housing in an axial direction, excluding the maze-forming portion, to the length from the inner surface of the bearing housing that faces the shaft seal to the distal end of the shaft bearing may be expressed as follows:

$1.1 \leq b/B \leq 1.4$ where "b" represents the length of the bearing housing in an axial direction, excluding the maze-forming portion, and "B" represents the length from the inner surface of the bearing housing that faces the shaft seal to the distal end of the shaft bearing.

The ratio of the outer diameter of a portion of the drive shaft that is assembled with the bearing seal unit to the outer diameter of a spline portion of the distal end of the drive shaft may be expressed as follows:

$1.03 \leq d2/d1 \leq 1.16$ where "d2" represents the outer diameter of a portion of the drive shaft that is assembled with the bearing seal unit, and "d1" represents the outer diameter of a spline portion of the distal end of the drive shaft.

The ratio of the inner diameter of the distal end of the small-diameter portion of the boot to the outer diameter of a portion of the drive shaft that is assembled with the bearing seal unit may be expressed as follows:

$0.9 \leq D2/d2 \leq 1$ where "D2" represents the inner diameter of the distal end of the small-diameter portion of the boot, and "d2" represents the outer diameter of a portion of the drive shaft that is assembled with the bearing seal unit.

The ratio of the length from the center of a groove formed in the wheel housing to the center of the shaft bearing to the outer diameter of a portion of the wheel housing that is assembled with the inner wheel of the wheel bearing may be expressed as follows:

$0.56 \leq L/D1 \leq 0.73$ where "L" represents the length from the center of a groove formed in the wheel housing to the center of the shaft bearing, and "D1" represents the outer diameter of a portion of the wheel housing that is assembled with the inner wheel of the wheel bearing.

BRIEF DESCRIPTION OF THE DRAWINGS

The above and other objects, features, and other advantages of the present disclosure will be more clearly understood from the following detailed description taken in conjunction with the accompanying drawings, in which:

FIG. 11A is a view for explaining numerical relationships between main components of the drive axle assembly according to the present disclosure, and FIG. 11B is an enlarged view for explaining a right side part of the drive axle assembly shown in FIG. 11A.

DETAILED DESCRIPTION

Figure 1:
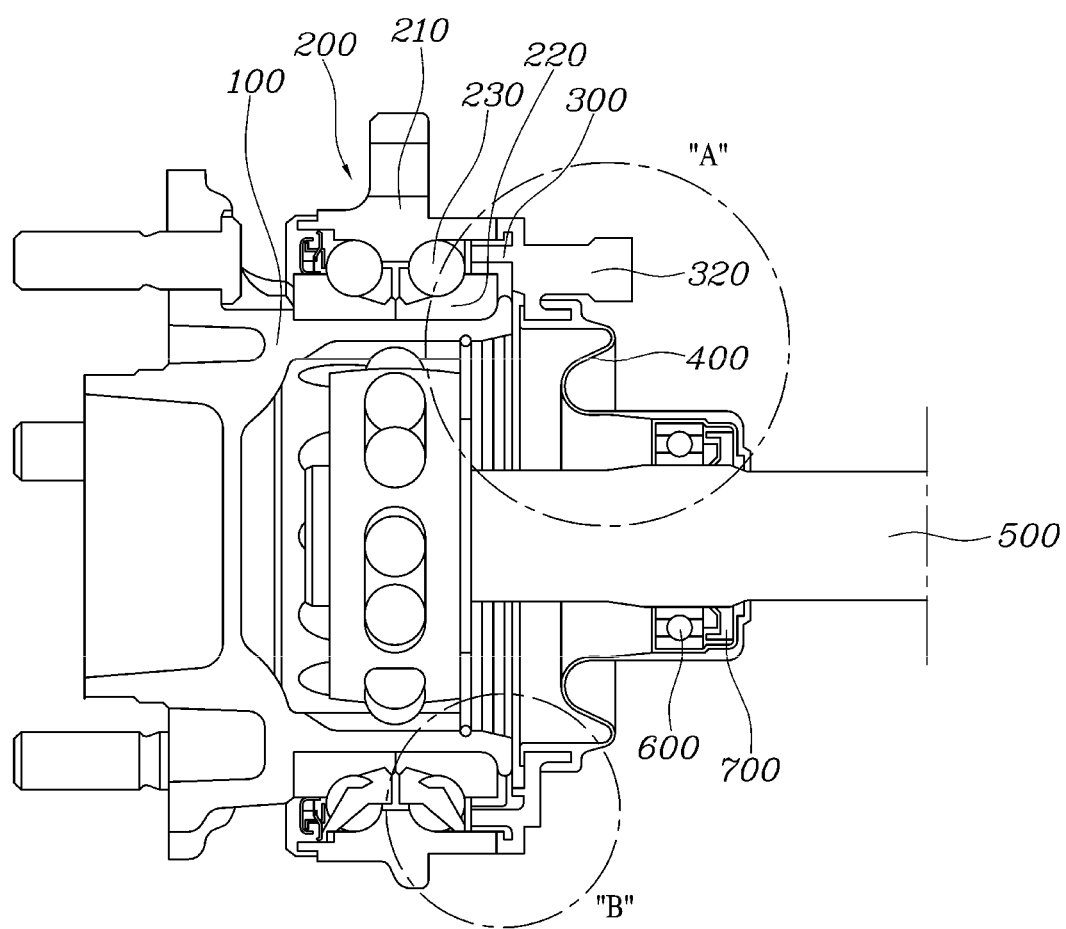
FIG. 1 is a cross-sectional view showing a drive axle assembly according to the present disclosure.

Various exemplary embodiments will now be described more fully with reference to the accompanying drawings, in which only some exemplary embodiments are shown. Specific structural and functional details disclosed herein are merely representative for the purpose of describing exemplary embodiments. The present disclosure, however, may be embodied in many alternative forms, and should not be construed as being limited to the exemplary embodiments set forth herein.

Accordingly, while exemplary embodiments of the disclosure are capable of being variously modified and taking alternative forms, embodiments thereof are shown by way of example in the drawings and will herein be described in detail. It should be understood, however, that there is no intent to limit the present disclosure to the particular exemplary embodiments disclosed. On the contrary, exemplary embodiments are to cover all modifications, equivalents, and alternatives falling within the scope of the disclosure.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of exemplary embodiments of the present disclosure.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present. Other words used to describe the relationship between elements should be interpreted in a like fashion (e.g. "between" versus "directly between", "adjacent" versus "directly adjacent", etc.).

The terminology used herein is for the purpose of describing particular embodiments only and is not intended to be limiting of exemplary embodiments of the disclosure. As used herein, the singular forms "a", "an", and "the", are intended to include the plural forms as well, unless the context clearly indicates otherwise. It will be further understood that the terms "comprises", "comprising", "includes", and/or "including", when used herein, specify the presence of stated features, integers, steps, operations, elements, components, or combinations thereof, but do not preclude the presence or addition of one or more other features, integers, steps, operations, elements, components, or combinations thereof.

Unless otherwise defined, all terms used herein, which include technical or scientific terms, have the same meanings as those generally appreciated by those skilled in the art. The terms, such as ones defined in common dictionaries, should be interpreted as having the same meanings as terms in the context of pertinent technology, and should not be interpreted as having ideal or excessively formal meanings unless clearly defined in the specification.

Hereinafter, an exemplary embodiment of the present disclosure will be described in detail with reference to the accompanying drawings.

FIG. 1 is a cross-sectional view showing a drive axle assembly according to the present disclosure.

Referring to the drawing, the drive axle assembly of the present disclosure is an integrated drive axle (IDA), in which an outer wheel 210 of a wheel bearing 200 is secured to a knuckle or a carrier, in which balls (or rollers) 230 and a cage are assembled and integrated with each other between the outer wheel 210 and an inner wheel 220 of the wheel bearing 200, and in which the wheel bearing 200 is fitted on the outer circumferential surface of a wheel housing 100.

An orbital forming process is performed on the distal end portion of the wheel housing 100 such that the distal end portion of the wheel housing 100 is bent radially outwards, and the wheel bearing 200 is preloaded such that the inner wheel 220 is secured to the wheel housing 100.

A drive shaft 500 is connected to the inside of the wheel housing 100 via a constant velocity joint. Accordingly, the drive force of a powertrain is transmitted to the constant velocity joint through the drive shaft 500, and the constant velocity joint is moved and articulated according to the behavior of the vehicle, whereby the wheel housing 100 is rotated.

A boot assembly including a boot 400 is disposed between the outer wheel 210 of the wheel bearing 200 and the drive shaft 500 and is assembled therewith in the state in which rotation is restricted.

Figure 2:
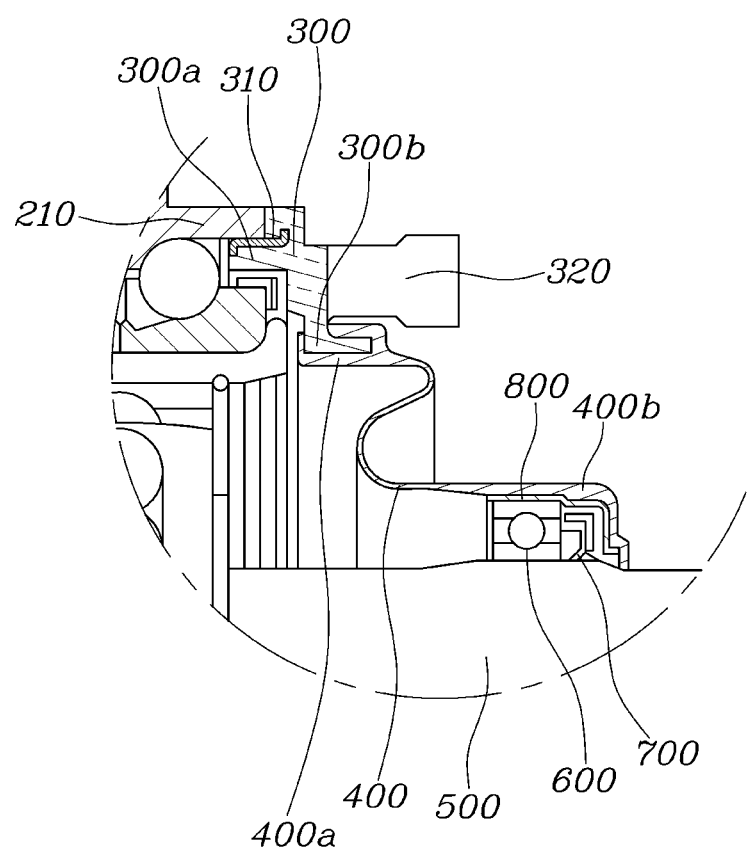
FIG. 2 is an enlarged view of portion A in FIG. 1.

Referring to FIGS. 1 and 2, the present disclosure includes the wheel bearing 200, which is assembled with the wheel housing 100, an outer ring 300, which has a ring shape and includes an outer-diameter portion 300a secured to the outer wheel 210 of the wheel bearing 200, the boot 400, which includes a large-diameter portion 400a formed at one end thereof and assembled with an inner-diameter portion 300b of the outer ring 300, and a bearing seal unit, which is disposed between a small-diameter portion 400b formed at the other end of the boot 400 and the drive shaft 500 so as to restrict rotation of the boot 400 and prevent the introduction of foreign substances.

In an example, the outer ring 300, which is made of a plastic material, is secured to the large-diameter portion 400a of the boot 400, and is coupled to the outer wheel 210 of the wheel bearing 200.

The bearing seal unit is disposed between the small-diameter portion 400b of the boot 400 and the drive shaft 500 and is assembled therewith so as to surround a portion of the drive shaft 500, thereby allowing the drive shaft 500 to rotate relative to the boot 400 and restricting rotation of the boot 400.

As described above, since the region between the outer wheel 210 and the inner wheel 220 of the wheel bearing 200 is covered by the outer ring 300, the introduction of foreign substances into the wheel bearing 200 is prevented. Accordingly, a conventional inner bearing seal is eliminated, which makes it possible to reduce drag torque, thus improving the fuel efficiency of the vehicle.

Furthermore, since the boot 400 is prevented from rotating even when the constant velocity joint rotates, the corrugations of the boot 400 are not repeatedly folded and unfolded in the circumferential direction when the vehicle makes a full turn or travels in any of various other drive modes. Accordingly, it possible to prevent the occurrence of frictional noise attributable to repeated contact and separation between the corrugations of the boot while the vehicle is traveling.

As shown in FIG. 2, the outer ring 300 may directly face the balls 230 provided in the wheel bearing 200 through the space between the outer wheel 210 and the inner wheel 220 of the wheel bearing 200.

That is, the outer ring 300 is coupled to the outer wheel 210 of the wheel bearing 200, and thus blocks the space between the outer wheel 210 and the inner wheel 220 of the wheel bearing 200, thereby preventing foreign substances from entering the wheel bearing 200.

As described above, a conventional inner bearing seal is eliminated from the wheel bearing, and the outer ring 300 is disposed so as to face the balls 230 provided in the wheel bearing 200. Accordingly, it is possible to prevent drag torque from increasing due to the inner bearing seal.

In addition, the outer ring 300 is provided with an ABS sensor 320.

In an example, the ABS sensor 320 is mounted in the outer ring 300, which is adjacent to the wheel bearing 200, to detect the wheel speed.

Still referring to FIG. 2, the bearing seal unit includes a shaft bearing 600 and a shaft seal 700.

In detail, the bearing seal unit includes the shaft bearing 600, which surrounds a portion of the drive shaft 500 and is disposed between the small-diameter portion 400b of the boot 400 and the drive shaft 500 so as to be assembled therewith, and the shaft seal 700, which is disposed between the shaft bearing 600 and the distal end of the small-diameter portion 400b of the boot 400 so as to be assembled therewith.

The shaft bearing 600 may be, for example, a ball bearing or a needle bearing. The inner wheel of the shaft bearing 600 is supported by the drive shaft 500, and the outer wheel of the shaft bearing 600 is supported by the small-diameter portion 400b of the boot 400.

Since the shaft seal 700 is mounted inside the distal end of the small-diameter portion 400b of the boot 400 so as to surround a portion of the drive shaft 500, introduction of foreign substances into the shaft bearing 600 and the boot 400 is prevented.

Although the shaft seal 700 affects the drag torque, the shaft seal 700 has a very short circumferential length compared to the conventional inner bearing seal mounted to the wheel bearing 200 due to the positional characteristics of the shaft seal 700, which is provided on the drive shaft 500. Accordingly, compared to the case in which the inner bearing seal is provided, drag torque is reduced, whereby the fuel efficiency of the vehicle is improved.

Figure 3:
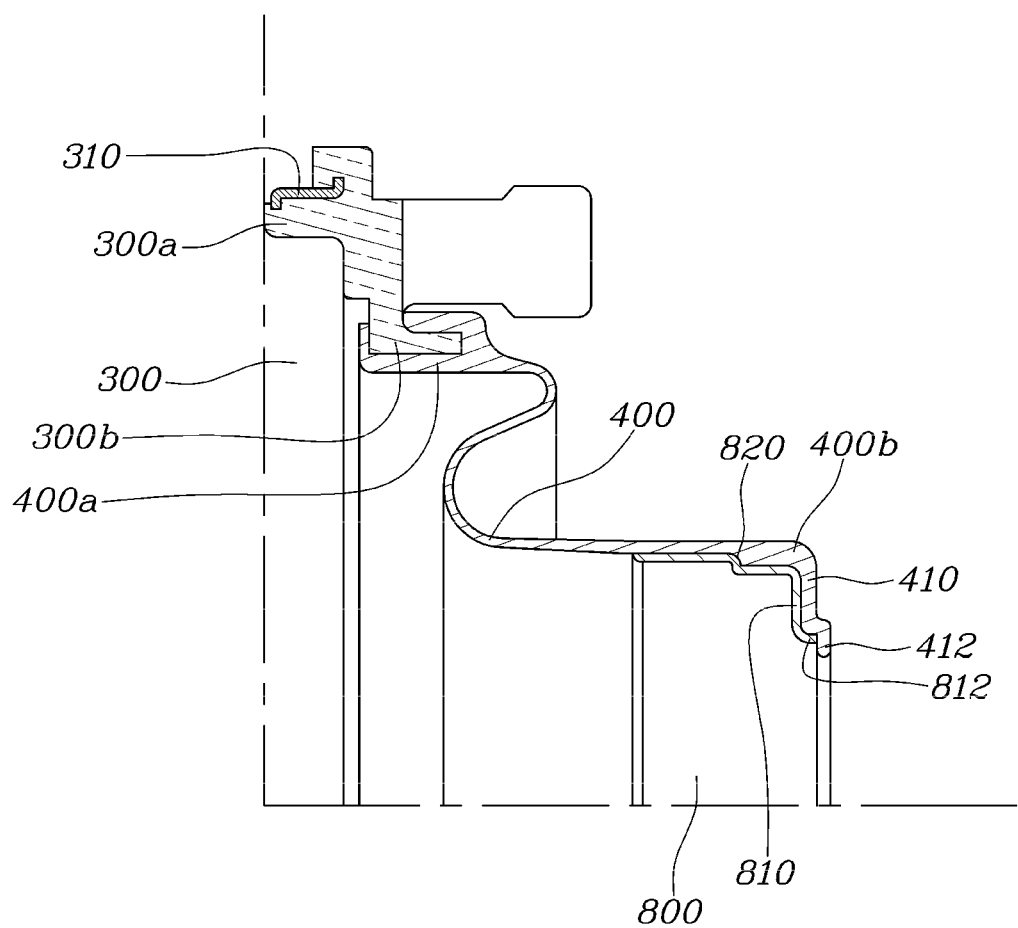
FIG. 3 is a cross-sectional view of a bearing housing according to the present disclosure.

FIG. 3 is a cross-sectional view of the bearing housing 800 according to the present disclosure.

Referring to the drawing, the bearing housing 800 may be press-fitted into the boot 400 so as to be in contact with the inner circumferential surface of the small-diameter portion 400b of the boot 400 and to surround the shaft bearing 600 and the shaft seal 700, and the bearing housing 800 may have a stepped portion 820 formed on the inner surface thereof to form a boundary between the shaft bearing 600 and the shaft seal 700.

In an example, the shaft bearing 600 is disposed on a portion of the inner surface of the bearing housing 800 that is adjacent to the large-diameter portion 400a of the boot 400 with respect to the stepped portion 820, and the shaft seal 700 is disposed on a portion of the inner surface of the bearing housing 800 that is adjacent to the small-diameter portion 400b of the boot 400 with respect to the stepped portion 820.

That is, the shaft bearing 600 and the shaft seal 700 may be securely and stably disposed in the bearing housing 800 due to the stepped portion 820, which is formed on the middle of the inner surface of the bearing housing 800.

In an example, the shaft bearing 600 and the shaft seal 700 may be press-fitted into the bearing housing 800, and the bearing housing 800 may be integrated with the boot 400.

In addition, referring to FIGS. 2 and 3, the boot 400 includes a housing support portion 410, which extends radially inwards from the distal end of the small-diameter portion 400b of the boot 400, and the bearing housing 800 includes a seal support portion 810, which extends radially inwards from the end of the bearing housing 800 that faces the housing support portion 410. The seal support portion 810 is supported by the inner surface of the housing support portion 410.

That is, the seal support portion 810 is in close contact with the inner surface of the housing support portion 410, thereby preventing external foreign substances from entering the boot 400 through a gap between the small-diameter portion 400b of the boot 400 and the bearing housing 800.

In addition, the bearing housing 800 includes a maze-forming portion 812, which extends in a stepped form toward the housing support portion 410 along the inner circumferential surface of the seal support portion 810, and the boot 400 includes a foreign-substance-blocking portion 412, which extends radially inwards in a stepped form along the inner circumferential surface of the housing support portion 410 to cover the maze-forming portion 812.

In an example, the foreign-substance-blocking portion 412 extends radially inwards toward the drive shaft 500, and covers the maze-forming portion 812 in the axial direction.

Accordingly, even if foreign substances are introduced into the space between the foreign-substance-blocking portion 412 and the drive shaft 500, the foreign substances are prevented from entering the region between the housing support portion 410 and the seal support portion 810 because the maze-forming portion 812 is in close contact with the inner surface of the foreign-substance-blocking portion 412.

Consequently, external foreign substances are prevented from entering the boot 400 through the gap between the small-diameter portion 400b of the boot 400 and the bearing housing 800. In addition, the shaft seal 700 reliably prevents introduction of foreign substances into the boot 400.

In addition, the present disclosure further includes a reinforcement ring 310, which is coupled to the outer-diameter portion 300a of the outer ring 300.

The reinforcement ring 310 may be inserted into the wheel bearing 200 such that the outer circumferential surface of the reinforcement ring 310 is in contact with the inner circumferential surface of the outer wheel 210 of the wheel bearing 200.

In an example, the reinforcement ring 310 may be made of a steel material, and may be integrally formed with the outer ring 300. The boot 400 may be integrally manufactured with the bearing housing 800 and the outer ring 300, with which the ABS sensor 320 is integrally formed.

Figure 4:
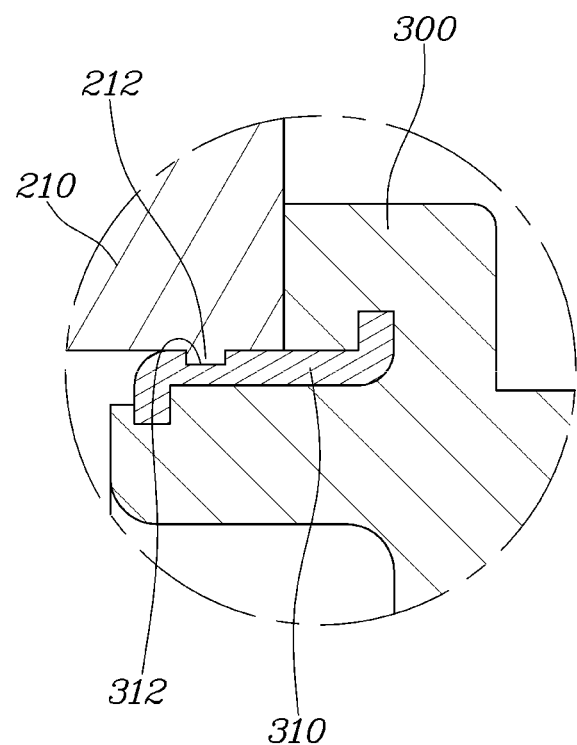
FIGS. 4 and 5 are views showing the structure in which an outer ring is coupled to the inner circumferential surface of an outer wheel of a wheel bearing according to the present disclosure.
Figure 5:
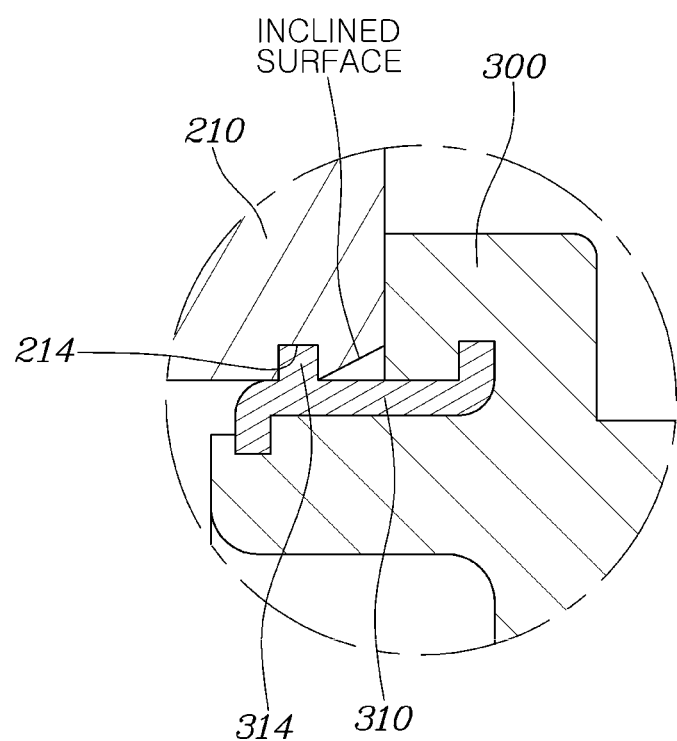

FIGS. 4 and 5 are views showing the structure in which the outer ring 300 is coupled to the inner circumferential surface of the outer wheel 210 of the wheel bearing 200 according to the present disclosure. The reinforcement ring 310 and the outer wheel 210 of the wheel bearing 200 corresponding thereto may be coupled to each other in a groove-and-protrusion coupling manner.

In an example, referring to FIG. 4, the reinforcement ring 310 has an assembly groove 312 formed in the outer circumferential surface thereof in the circumferential direction, and the outer wheel 210 of the wheel bearing 200 has an assembly protrusion 212 formed on the inner circumferential surface thereof in the circumferential direction so as to correspond to the assembly groove 312. The assembly protrusion 212 is fitted into the assembly groove 312.

In another example, referring to FIG. 5, the reinforcement ring 310 has an assembly protrusion 314 formed on the outer circumferential surface thereof in the circumferential direction, and the outer wheel 210 of the wheel bearing 200 has an assembly groove 214 formed in the inner circumferential surface thereof in the circumferential direction so as to correspond to the assembly protrusion 314. The assembly protrusion 314 is fitted into the assembly groove 214.

Accordingly, the reinforcement ring 310 is securely assembled with the outer wheel 210 of the wheel bearing 200, thereby preventing the boot 400 from being separated from the outer wheel 210 of the wheel bearing 200.

Furthermore, the distal end of the inner circumferential surface of the outer wheel 210 of the wheel bearing 200 is formed at an incline in a chamfered form, whereby the assembly protrusion 314 formed on the reinforcement ring 310 may be easily fitted into the assembly groove 214 formed in the outer wheel 210.

Figure 6:
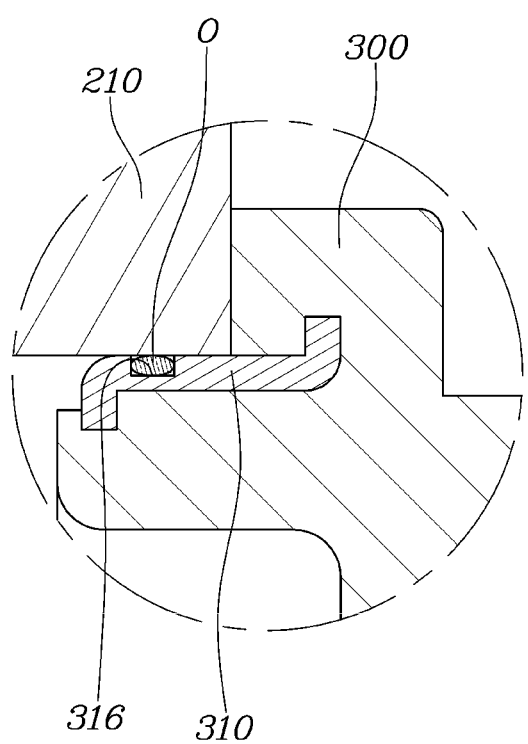
FIGS. 6 and 7 are views showing the structure in which an O-ring is interposed between the outer wheel of the wheel bearing and the outer ring according to the present disclosure.
Figure 7:
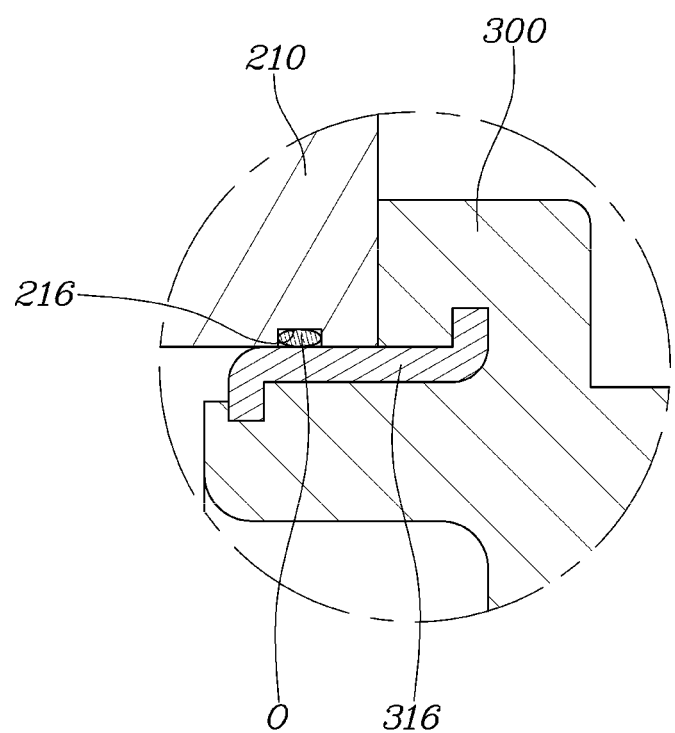

FIGS. 6 and 7 are views showing the structure in which an O-ring O is interposed between the outer wheel 210 of the wheel bearing 200 and the outer ring 300 according to the present disclosure. An O-ring O may be interposed between the reinforcement ring 310 and the outer wheel 210 of the wheel bearing 200 corresponding thereto.

In an example, referring to FIG. 6, the reinforcement ring 310 may have a ring groove 316 formed in the outer circumferential surface thereof in the circumferential direction, and the O-ring O may be fitted into the ring groove 316.

In another example, referring to FIG. 7, the outer wheel 210 of the wheel bearing 200 may have a ring groove 216 formed in the inner circumferential surface thereof in the circumferential direction, and the O-ring O may be fitted into the ring groove 216.

The O-ring O serves not only to prevent foreign substances from entering the wheel bearing 200 but also to prevent grease from leaking from the wheel bearing 200.

Figure 8:
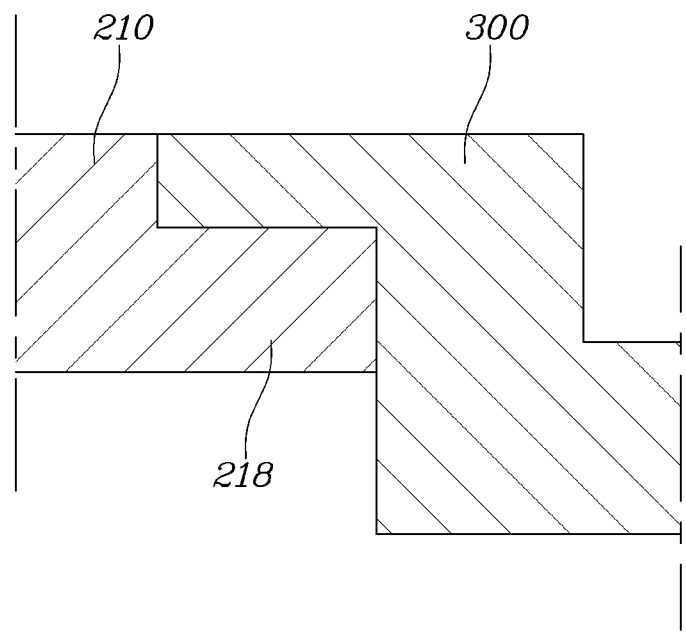
FIGS. 8 and 9 are views showing the structure in which the outer ring is coupled to the outer circumferential surface of the outer wheel of the wheel bearing according to the present disclosure.
Figure 9:
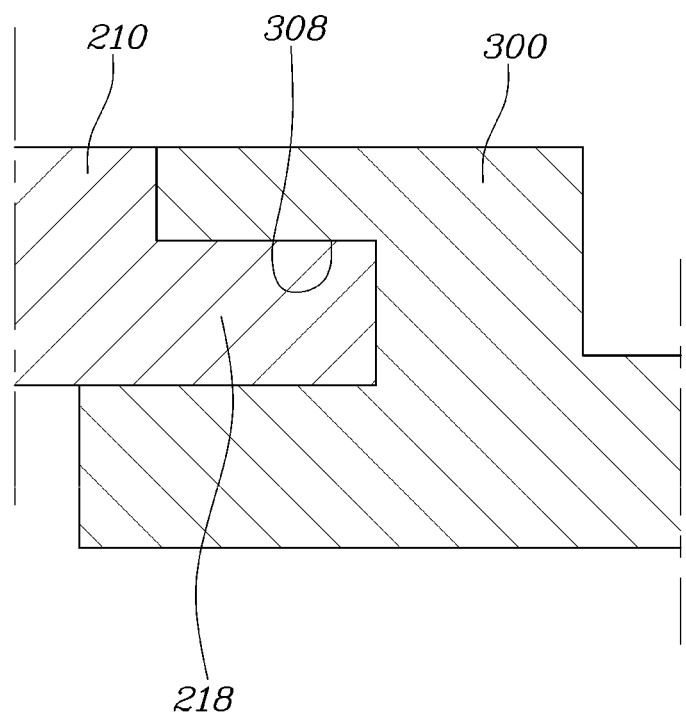

FIGS. 8 and 9 are views showing the structure in which the outer ring 300 is coupled to the outer circumferential surface of the outer wheel 210 of the wheel bearing 200 according to the present disclosure. A portion of the outer wheel 210 may be inserted into the outer ring 300 such that the outer circumferential surface thereof is in contact with the inner circumferential surface of the outer ring 300.

In an example, referring to FIG. 8, the outer wheel 210 may have a stepped insertion portion 218, which extends from the end of the outer circumferential surface thereof in a stepped form so as to have a reduced outer diameter. The stepped insertion portion 218 may be press-fitted into the outer ring 300 such that the outer circumferential surface thereof is in contact with the inner circumferential surface of the outer ring 300.

That is, the stepped insertion portion 218 may be formed so as to be stepped from the outer circumferential surface of the distal end of the outer wheel 210 of the wheel bearing 200. The stepped insertion portion 218 may be press-fitted into the outer ring 300 such that the distal end of the stepped insertion portion 218 in the axial direction is in close contact with the inner surface of the outer ring 300, thereby ensuring a seal between the outer wheel 210 and the outer ring 300 and preventing separation of the boot 400.

In an example, in the case in which the reinforcement ring 310 is secured to the inner circumferential surface of the outer ring 300, the reinforcement ring 310 may be in close contact with the outer circumferential surface of the stepped insertion portion 218.

In another example, referring to FIG. 9, the outer wheel 210 may have a stepped insertion portion 218 that extends from the end of the outer circumferential surface thereof in a stepped form so as to have a reduced outer diameter, and the outer ring 300 may have a stepped insertion groove 308 formed in the outer-diameter portion 300a thereof so as to correspond to the stepped insertion portion 218. The stepped insertion portion 218 may be press-fitted into the stepped insertion groove 308.

That is, the stepped insertion portion 218 may be formed so as to be stepped from the outer circumferential surface of the distal end of the outer wheel 210 of the wheel bearing 200. The stepped insertion portion 218 may be press-fitted into the stepped insertion groove 308 formed in the outer ring 300 such that the stepped insertion portion 218 is enveloped by the outer ring 300 and such that the distal end of the stepped insertion portion 218 in the axial direction is in close contact with the end of the inner surface of the stepped insertion groove 308, thereby ensuring a seal between the outer wheel 210 and the outer ring 300 and preventing separation of the boot 400.

Figure 10:
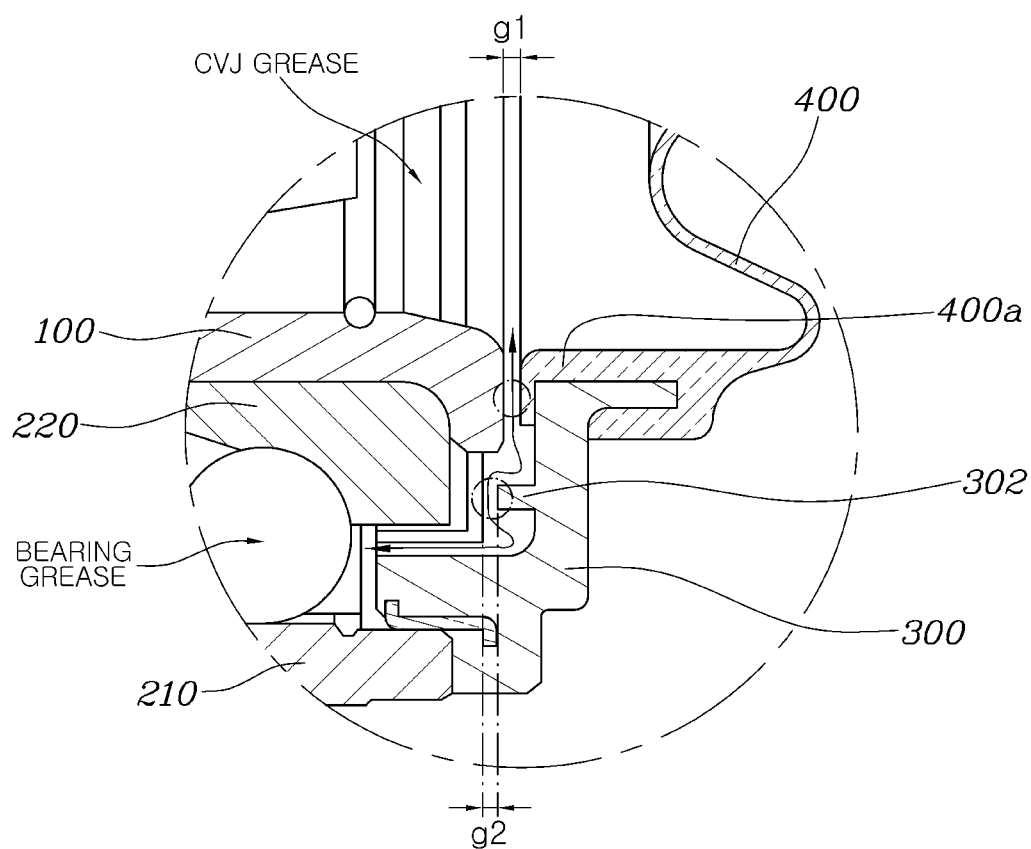
FIG. 10 is an enlarged view of portion B in FIG. 1.

FIG. 10 is an enlarged view of portion B in FIG. 1.

Referring to the drawing, the large-diameter portion 400a of the boot 400 envelopes the inner-diameter portion 300b of the outer ring 300, and thus a gap g1 having a size less than a predetermined value may be formed between the large-diameter portion 400a of the boot 400 and the wheel housing 100. The outer ring 300 may have a protruding portion 302 formed on the inner surface thereof toward the wheel bearing 200, and thus a gap g2 having a size less than a predetermined value may be formed between the protruding portion 302 and the inner surface of the wheel bearing 200.

In an example, a fine gap may be formed between the inner wheel 220 of the wheel bearing 200 and the inner surface of the outer ring 300 that faces the inner wheel 220, and a fine gap may be formed between the distal end of the wheel housing 100, which has undergone an orbital forming process, and the large-diameter portion 400a of the boot 400, which faces the distal end of the wheel housing 100.

A maze structure is formed in the boot 400 due to formation of the two fine gaps, thereby making it possible to prevent grease for the constant velocity joint in the wheel housing 100 and grease for the bearing in the wheel bearing 200 from mixing.

FIG. 11A is a view for explaining numerical relationships between main components of the drive axle assembly according to the present disclosure and FIG. 11B is an enlarged view for explaining a right side part of the drive axle assembly in FIG. 11A. Referring to FIG. 11B, the ratio of the length b of the bearing housing 800 in the axial direction, excluding the maze-forming portion 812, to the length C from the inner surface of the bearing housing 800 that faces the shaft seal 700 to the distal end of the shaft bearing 600 may be expressed using Expression (1) below.

$$1.1 \le b/C \le 1.4 \tag{1}$$

Here, "b" represents the length of the bearing housing in the axial direction, excluding the maze-forming portion, and "C" represents the length from the inner surface of the bearing housing that faces the shaft seal to the distal end of the shaft bearing.

According to the above numerical relationships, the shaft bearing 600 and the shaft seal 700 are stably assembled in the bearing housing 800, whereby the ease of assembly of the bearing seal unit may be improved, and the sealing capability thereof may be ensured.

Still referring to FIG. 11A, the ratio of the outer diameter d2 of the portion of the drive shaft 500 that is assembled with the bearing seal unit to the outer diameter d1 of a spline portion of the distal end of the drive shaft 500 may be expressed using Expression (2) below.

$$1.03 \le d2/d1 \le 1.16 \tag{2}$$

Here, "d2" represents the outer diameter of the portion of the drive shaft that is assembled with the bearing seal unit, and "d1" represents the outer diameter of a spline portion of the distal end of the drive shaft.

According to the above numerical relationships, the ease of assembly of the components may be improved, and vibration of rotary bodies, including the drive shaft 500, may be reduced.

Still referring to FIGS. 11A and 11B, the ratio of the inner diameter D2 of the distal end of the small-diameter portion 400b of the boot 400 to the outer diameter d2 of a portion of the drive shaft 500 that is assembled with the bearing seal unit may be expressed using Expression (3) below.

$$0.9 \le D2/d2 \le 1 \tag{3}$$

Here, "D2" represents the inner diameter of the distal end of the small-diameter portion of the boot, and "d2" represents the outer diameter of a portion of the drive shaft that is assembled with the bearing seal unit.

According to the above numerical relationships, the foreign-substance-blocking portion 412 is formed in the maze-forming portion 812, thereby realizing a maze structure, thus preventing the introduction of foreign substances thereinto.

Still referring to FIG. 11A, the ratio of the length L from the center of a groove formed in the wheel housing 100 to the center of the shaft bearing 600 to the outer diameter D1 of a portion of the wheel housing 100 that is assembled with the inner wheel 220 of the wheel bearing 200 may be expressed using Expression (4) below.

$$0.56 \le L/D1 \le 0.73 \tag{4}$$

Here, "L" represents the length from the center of a groove formed in the wheel housing to the center of the shaft bearing, and "D1" represents the outer diameter of a portion of the wheel housing that is assembled with the inner wheel of the wheel bearing.

As is apparent from the above description, according to the present disclosure, the conventional inner bearing seal, which seals the gap between the outer wheel 210 and the inner wheel 220 of the wheel bearing 200, is eliminated, and the outer ring 300 is provided so as to cover the outer wheel 210, thereby not only preventing the introduction of foreign substances but also reducing drag torque generated by a seal, thus improving the fuel efficiency of the vehicle.

In addition, since the boot 400 is prevented from rotating, the corrugations of the boot 400 are not repeatedly folded and unfolded in the circumferential direction when the vehicle makes a full turn or travels in any of various other drive modes. Accordingly, it possible to prevent the occurrence of frictional noise attributable to repeated contact and separation between the corrugations of the boot while the vehicle is traveling.

Although specific embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A drive axle assembly comprising:
   a wheel bearing assembled with a wheel housing;
   an outer ring having a ring shape and comprising an outer-diameter portion secured to an outer wheel of the wheel bearing;
   a boot comprising a large-diameter portion formed at one end thereof and assembled with an inner-diameter portion of the outer ring;
   a bearing seal unit disposed between a small-diameter portion formed at another end of the boot and a drive shaft to restrict rotation of the boot and to prevent introduction of foreign substances; and
   a reinforcement ring coupled to the outer-diameter portion of the outer ring;
   wherein the reinforcement ring is inserted into the wheel bearing such that an outer circumferential surface of the reinforcement ring is in contact with an inner circumferential surface of the outer wheel of the wheel bearing.

2. The drive axle assembly according to claim 1, wherein the outer ring directly faces balls provided in the wheel bearing through a space between the outer wheel and an inner wheel of the wheel bearing.

3. The drive axle assembly according to claim 1, wherein the outer ring is provided with an anti-lock brake system sensor.

4. The drive axle assembly according to claim 1, wherein the bearing seal unit comprises:
   a shaft bearing disposed between the small-diameter portion of the boot and the drive shaft so as to surround a portion of the drive shaft; and
   a shaft seal disposed between the shaft bearing and a distal end of the small-diameter portion of the boot.

5. The drive axle assembly according to claim 4, further comprising:
   a bearing housing press-fitted into the boot so as to be in contact with an inner circumferential surface of the small-diameter portion of the boot and to surround the shaft bearing and the shaft seal,
   wherein the bearing housing has a stepped portion formed on an inner surface thereof to form a boundary between the shaft bearing and the shaft seal.

6. The drive axle assembly according to claim 5, wherein the boot has a housing support portion extending radially inwards from the distal end of the small-diameter portion thereof,
   wherein the bearing housing has a seal support portion extending radially inwards from an end of the bearing housing that faces the housing support portion, and
   wherein the seal support portion is supported by an inner surface of the housing support portion.

7. The drive axle assembly according to claim 6, wherein the bearing housing has a maze-forming portion extending in a stepped form toward the housing support portion along an inner circumferential surface of the seal support portion, and
   wherein the boot has a foreign-substance-blocking portion extending radially inwards in a stepped form along an inner circumferential surface of the housing support portion so as to cover the maze-forming portion.

8. The drive axle assembly according to claim 7, wherein a ratio of a length of the bearing housing in an axial direction, excluding the maze-forming portion, to a length from an inner surface of the bearing housing that faces the shaft seal to a distal end of the shaft bearing is as follows:

$$1.1 \leq b/C \leq 1.4$$

where "b" represents a length of the bearing housing in an axial direction, excluding the maze-forming portion, and "C" represents a length from an inner surface of the bearing housing that faces the shaft seal to a distal end of the shaft bearing.

9. The drive axle assembly according to claim 4, wherein a ratio of a length from a center of a groove formed in the wheel housing to a center of the shaft bearing to an outer diameter of a portion of the wheel housing that is assembled with an inner wheel of the wheel bearing is as follows:

$$0.56 \leq L/D1 \leq 0.73$$

where "L" represents a length from a center of a groove formed in the wheel housing to a center of the shaft bearing, and "D1" represents an outer diameter of a portion of the wheel housing that is assembled with an inner wheel of the wheel bearing.

10. The drive axle assembly according to claim 1, wherein the reinforcement ring and the outer wheel of the wheel bearing corresponding to the reinforcement ring are coupled to each other in a groove-and-protrusion coupling manner.

11. The drive axle assembly according to claim 1, further comprising an O-ring interposed between the reinforcement ring and the outer wheel of the wheel bearing corresponding to the reinforcement ring.

12. The drive axle assembly according to claim 1, wherein the large-diameter portion of the boot envelopes the inner-diameter portion of the outer ring such that a gap having a size less than a predetermined value is formed between the large-diameter portion of the boot and the wheel housing, and
   wherein the outer ring has a protruding portion formed on an inner surface thereof toward the wheel bearing such that a gap having a size less than a predetermined value is formed between the protruding portion and an inner surface of the wheel bearing.

13. The drive axle assembly according to claim 1, wherein a ratio of an outer diameter of a portion of the drive shaft that is assembled with the bearing seal unit to an outer diameter of a spline portion of a distal end of the drive shaft is as follows:

$$1.03 \leq d2/d1 \leq 1.16$$

where "d2" represents an outer diameter of a portion of the drive shaft that is assembled with the bearing seal unit, and "d1" represents an outer diameter of a spline portion of a distal end of the drive shaft.

14. The drive axle assembly according to claim 1, wherein a ratio of an inner diameter of a distal end of the small-diameter portion of the boot to an outer diameter of a portion of the drive shaft that is assembled with the bearing seal unit is as follows:

$$0.9 \leq D2/d2 \leq 1$$

where "D2" represents an inner diameter of a distal end of the small-diameter portion of the boot, and "d2" represents an outer diameter of a portion of the drive shaft that is assembled with the bearing seal unit.

* * * * *